US010848986B2

(12) United States Patent
Lopez-Perez et al.

(10) Patent No.: US 10,848,986 B2
(45) Date of Patent: Nov. 24, 2020

(54) METHOD FOR MANAGING A WIRELESS PASSIVE OPTICAL NETWORK

(71) Applicant: Nokia Technologies OY, Espoo (FI)

(72) Inventors: David Lopez-Perez, Dublin (IE); Adrian Garcia Rodriguez, Dublin (IE); Lorenzo Galati Giordano, Dublin (IE); Giovanni Geraci, Dublin (IE); Michael Timmers, Herent (BE); Nikolas Olaziregi, Antwerp (BE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/375,928

(22) Filed: Apr. 5, 2019

(65) Prior Publication Data

US 2019/0335344 A1    Oct. 31, 2019

(30) Foreign Application Priority Data

Apr. 30, 2018  (EP) ..................................... 18170130

(51) Int. Cl.
*H04W 24/02* (2009.01)
*H04B 7/0408* (2017.01)
(Continued)

(52) U.S. Cl.
CPC .......... *H04W 24/02* (2013.01); *H04B 7/0408* (2013.01); *H04B 7/0617* (2013.01);
(Continued)

(58) Field of Classification Search
CPC .. H04W 24/02; H04W 16/28; H04L 41/0816; H04B 7/0408; H04B 7/0617
See application file for complete search history.

(56) References Cited

U.S. PATENT DOCUMENTS 10,178,445 B2* 1/2019 Lubranski ............ H04Q 3/0091
2011/0244800 A1* 10/2011 Bogestam ............ H04W 76/14
455/41.2
(Continued)

FOREIGN PATENT DOCUMENTS

WO    WO-2018/004509 A1    1/2018

OTHER PUBLICATIONS

European Search Report dated May 16, 2018 issued in corresponding European Application No. 18170130.1.
(Continued)

*Primary Examiner* — Wei Zhao
(74) *Attorney, Agent, or Firm* — Harness, Dickey & Pierce, P.L.C.

(57) ABSTRACT

Method for managing a wireless passive optical network, including a plurality of access points, APs, and a plurality of customer premises equipments, CPEs. The method includes configuring an AP to CPE association based on a load balancing algorithm such that each CPE is associated with at least one AP; configuring for each AP an AP beamforming codebook based on the configured association, wherein the AP beamforming codebook includes entries, wherein each entry is representative for a beam pattern to be transmitted by the AP, and wherein the AP beamforming codebook includes for each CPE associated with the AP—a line of sight, LoS, entry representative for a beam pattern to be transmitted to the respective CPE via a LoS path; and at least one back-up entry representative for a beam pattern to be transmitted to the respective CPE via a back-up path different from the LoS path.

15 Claims, 4 Drawing Sheets

(51) Int. Cl.
  *H04B 7/06* (2006.01)
  *H04B 10/2575* (2013.01)
  *H04L 12/24* (2006.01)
  *H04W 16/28* (2009.01)
  *H04W 28/08* (2009.01)

(52) U.S. Cl.
  CPC ... *H04B 10/25752* (2013.01); *H04L 41/0816* (2013.01); *H04W 16/28* (2013.01); *H04W 28/08* (2013.01)

(56) References Cited

U.S. PATENT DOCUMENTS

| | | |
|---|---|---|
| 2014/0073337 A1 | 3/2014 | Hong et al. |
| 2020/0028700 A1* | 1/2020 | Zaks .................. H04L 63/0272 |

OTHER PUBLICATIONS

European Office Action dated Jun. 29, 2020 issued in corresponding European Application No. 18170130.1.

* cited by examiner

METHOD FOR MANAGING A WIRELESS PASSIVE OPTICAL NETWORK

CROSS-REFERENCE TO RELATED APPLICATIONS

This present application claims priority under 35 U.S.C. § 119 to European Patent Application No. 18170130.1, filed Apr. 30, 2018, in the European Patent Office, the entire contents of which are hereby incorporated by reference.

FIELD OF INVENTION

The field of the invention relates to a method and system for managing a wireless passive optical network. Particular embodiments relate to a method for managing a wireless passive optical network comprising a plurality of access points and a plurality of customer premises equipments.

BACKGROUND

Wireless passive optical networks (WPON) serve to provide last-mile connectivity using wireless technologies operating at 60 GHz. Proper operation in the 60 GHz domain depends on beamforming gains of the WPON access point (AP) and/or the WPON customer premises equipment (CPE).

The use of highly directional beams and the propagation characteristics of mm-wave frequencies creates the risk of generating interference towards neighbouring APs and/or CPEs in dense deployments. The highly directional beams as defined in the corresponding beamforming codebook of one AP or CPE may accidentally interfere the reception of another AP or CPE. In existing WPON solutions APs and/or CPEs work as independent operators which are set up from factory and remain static while deployed.

As an example, the 802.11ad equipment, which may be used to construct a WPON, typically has a limited number of available beams and corresponding beamforming codebook entries, and they are configured to uniformly cover the 3D space or part of it using a discrete Fourier transform approach. More in particular the 802.11ad equipment considered here typically only has 64 codebook entries uniformly distributed in elevation and azimuth. When multiple of such equipments are deployed in the vicinity of each other, interference problems are to be expected. A large range of interference-avoiding solutions have been proposed which make use of a central scheduler to allocate interfering on different slots in frequency and time.

SUMMARY

The object of embodiments of the present invention is to provide a method and a system for managing a WPON which provides better performance as compared to prior art solutions. More in particular, the object of embodiments of the present invention is to provide a method and system for managing a WPON which reduces interference at the APs and/or CPEs of the WPON. In addition it is the object of embodiments to provide a method and system for managing a WPON which offers good performance in dynamic scenarios wherein multiple APs and/or CPEs are present and wherein new APs and/or CPEs may be added.

According to a first aspect of the present invention there is provided a method for managing a wireless passive optical network (WPON) comprising a plurality of access points (APs) and a plurality of customer premises equipments (CPEs). The method comprises configuring an AP to CPE association based on a load balancing algorithm such that each CPE of the plurality of CPEs is associated with at least one AP of the plurality of APs. The method further comprises configuring, for each AP of the plurality of APs, an AP beamforming codebook based on the configured association, wherein the AP beamforming codebook comprises entries wherein each entry is representative for a beam pattern to be transmitted by said AP, and wherein the AP beamforming codebook comprises for each CPE associated with the respective AP:

a line of sight (LoS) entry representative for a beam pattern to be transmitted to the respective CPE via a LoS path between the AP and the respective CPE; and
   at least one back-up entry representative for a beam pattern to be transmitted to the respective CPE via a back-up path which is different from the LoS path.

Embodiments of the present invention are based inter alia on the insight that by on the one hand configuring an AP to CPE association based on a load balancing algorithm such that each CPE is associated with at least one AP, and on the other hand configuring for each AP an AP beamforming codebook based on the configured association, it is possible to optimise the AP beamforming codebook entries for any particular scenario or WPON environment. Moreover, by configuring the AP beamforming codebook to comprise at least one back-up entry representative for a beam pattern to be transmitted to the respective CPE via a back-up path different from the LoS path, it is possible for the AP to quickly adapt its transmission when the LoS path is blocked, e.g. due to a moving and/or blocking object. In this manner interference in the WPON is reduced and performance is increased.

In an embodiment the at least one back-up entry comprises a reflection entry representative for a beam pattern to be transmitted to the respective CPE via a reflected path. In this manner, the AP can efficiently change from a LoS transmission according to a LoS entry of the AP beamforming codebook to a reflected transmission according to a reflection entry of the AP beamforming codebook. This may be useful in a situation wherein the LoS path may be blocked and does not provide the required throughput. In such a situation it may be beneficial to quickly switch to transmitting along a reflected path, whereas in other circumstances the LoS path may be preferred.

In an embodiment the at least one back-up entry comprises a relay entry representative for a beam pattern to be transmitted to the respective CPE via a relay path wherein at least one CPE of the plurality of CPEs other than the respective CPEs is used as a relay. Alternatively or in addition at least one AP of the plurality of APs other than the AP which is to transmit the beam pattern may be used as a relay in the relay path. In this manner, the AP can efficiently change from a LoS transmission according to a LoS entry of the AP beamforming codebook to a relay transmission according to a relay entry of the AP beamforming codebook. This may be useful in a situation wherein the LoS path may be blocked and does not provide the required throughput. In such a situation it may be beneficial to quickly switch to transmitting along a relay path wherein at least one other AP and/or CPE is used as a relay node, whereas in other circumstances the LoS path may be preferred.

In an embodiment the method further comprises scanning the WPON for changes in AP and/or CPE configuration, and triggering the configuring of the AP to CPE association when an AP is added and/or removed from the WPON and/or when a CPE is added and/or removed from the WPON. In this manner, the method allows for an auto-configuration and self-organisation of the APs and/or CPEs in the WPON. When an AP or CPE is added to an existing WPON the configuration of the existing WPON may not be optimal to maintain in view of the added AP or CPE. However, by monitoring changes in the AP and/or CPE configuration of the WPON and configuring the AP to CPE association when such an added AP and/or CPE is detected, it is possible to achieve an optimal AP to CPE association according to a load balancing algorithm, taking into account the APs and CPEs which were already part of the WPON and the added AP and/or CPE.

In an embodiment configuring the AP to CPE association is performed periodically. In this manner, the method allows for an auto-configuration and self-organisation of the APs and/or CPEs in the WPON. An existing WPON configuration may become suboptimal over time, for example by addition or removal of an AP or CPE, or by transmission paths getting blocked by for example new buildings. However, by periodically triggering the configuring of the AP to CPE association, it is possible to achieve an optimal AP to CPE association according to a load balancing algorithm, taking into account changes in the WPON which may have occurred over time, e.g. addition or removal of AP or CPE, transmission paths getting blocked, etc.

In an embodiment the method further comprises configuring, for at least one CPE of the plurality of CPEs, a CPE beamforming codebook based on the configured association, wherein the CPE beamforming codebook comprises entries wherein each entry is representative for a beam pattern to be transmitted by said CPE. In addition to configuring the AP beamforming codebook, configuring the CPE beamforming codebook allows for even better performance in the WPON because this allows for a more accurate beam alignment. An AP in the WPON can transmit to other APs or CPEs and receive from other APs or CPEs in the WPON. In a similar manner, a CPE in the WPON can transmit to other APs or CPEs and receive from other APs or CPEs in the WPON. Due to the challenging 60 GHz channel, where attenuation is large due to oxygen absorption, beam alignment is key to combat the large path loss. Therefore, by configuring a CPE beamforming codebook based on the configured association in addition to the configuration of AP beamforming codebooks, both the antenna gain of AP and the antenna gain of CPE may be aligned. In this manner, both the AP(s) and CPE(s) can be configured to have optimal beams pointing towards each other and/or overlapping with each other.

In a similar manner as described for the AP beamforming codebook the CPE beamforming codebook comprises line of sight (LoS) entries and back-up entries.

In an embodiment configuring the AP to CPE association comprises any one of de-associating a CPE from an AP, re-associating a CPE to an AP, associating a CPE to an AP, or any combination thereof. In this manner an optimal AP to CPE association according to a load balancing algorithm may be achieved. Associating a CPE to an AP corresponds with associating a CPE to an AP for the first time, for example during initial set-up of the WPON or when a new CPE and/or AP is added to an existing WPON. De-associating a CPE from an AP removes a previously associated CPE from the AP and may free up AP beamforming codebook capacity. Re-associating a CPE to an AP may associate a CPE to an AP which is currently not associated to the AP but which in the past has been associated to the AP.

In an embodiment configuring the AP beamforming codebook comprises associating with each entry for a CPE an identifier of the respective CPE. In this manner, AP beamforming codebook entry selection is facilitated prior to data transmission. The AP can associate an identifier of the respective CPE, e.g. MAC address, to the AP beamforming codebook entries and only search the according entries when a particular CPE is selected for scheduling.

In an embodiment configuring the AP beamforming codebook comprises configuring multiple AP codebooks per AP, wherein each AP codebook corresponds with a subset of CPEs from the plurality of CPEs, preferably with a single CPE from the plurality of CPEs. This is beneficial in particular when beamforming codebook size is limited. This allows the AP to pull the required codebook according to a CPE scheduling decision. Preferably, each AP has one AP beamforming codebook per CPE.

According to another aspect of the present invention, there is provided a wireless passive optical network (WPON) managing system for managing a WPON comprising a plurality of access points, (APs) and a plurality of customer premises equipments (CPEs), wherein the managing system comprises a controller configured to:

configure an AP to CPE association based on a load balancing algorithm such that each CPE of the plurality of CPEs is associated with at least one AP of the plurality of APs; and configure for each AP of the plurality of APs an AP beamforming codebook based on the configured association, wherein the AP beamforming codebook comprises entries wherein each entry is representative for a beam pattern to be transmitted by said AP, such that the AP beamforming codebook comprises for each CPE associated with the respective AP:

a line of sight (LoS) entry representative for a beam pattern to be transmitted to the respective CPE via a LoS path between the AP and the respective CPE; and at least one back-up entry representative for a beam pattern to be transmitted to the respective CPE via a back-up path which is different from the LoS path.

It will be understood by the skilled person that the features and advantages disclosed hereinabove with respect to various embodiments of the method embodiments may also apply, mutatis mutandis, to various system embodiments.

In an embodiment the at least one back-up entry comprises a reflection entry representative for a beam pattern to be transmitted to the respective CPE via a reflected path.

In an embodiment the at least one back-up entry comprises a relay entry representative for a beam pattern to be transmitted to the respective CPE via a relay path wherein at least one CPE of the plurality of CPEs other than the respective CPE and/or at least one AP of the plurality of APs other than the respective AP is used as a relay.

In an embodiment the controller is configured to scan the WPON for changes in AP and/or CPE configuration; and to trigger the configuring of the AP to CPE association when an AP is added and/or removed from the WPON and/or when a CPE is added and/or removed from the WPON.

In an embodiment the controller is configured to periodically configure the AP to CPE association.

In an embodiment the controller is configured to configure, for at least one CPE of the plurality of CPEs, a CPE beamforming codebook based on the configured association, wherein the CPE beamforming codebook comprises entries wherein each entry is representative for a beam pattern to be transmitted by said CPE.

In an embodiment the controller is configured to configure the AP to CPE association by any one of de-associating a CPE from an AP, re-associating a CPE to an AP, associating a CPE to an AP, or any combination thereof.

In an embodiment the controller is configured to associate with each entry for a CPE an identifier of the respective CPE while configuring the AP beamforming codebook.

In an embodiment the controller is configured to configure multiple AP codebooks per AP, wherein each AP codebook corresponds with a subset of CPEs from the plurality of CPEs, preferably with a single CPE from the plurality of CPEs.

According to yet another aspect of the present invention, there is provided a digital storage medium encoding a computer-executable program of instructions to perform, when executed on a computer, the steps of the method of any one of the method embodiments described above.

It will be understood by the skilled person that the features and advantages disclosed hereinabove with respect to method and/or system embodiments may also apply, mutatis mutandis, to embodiments of the computer program product.

Further aspects of the present invention are described by the dependent claims. The features from the dependent claims, features of any of the independent claims and any features of other dependent claims may be combined as considered appropriate to the person of ordinary skill in the art, and not only in the particular combinations as defined by the claims.

BRIEF DESCRIPTION OF THE FIGURES

The accompanying drawings are used to illustrate presently preferred non-limiting exemplary embodiments of devices of the present invention. The above and other advantages of the features and objects of the present invention will become more apparent and the present invention will be better understood from the following detailed description when read in conjunction with the accompanying drawings, in which.

DESCRIPTION OF EMBODIMENTS

Figure 1:
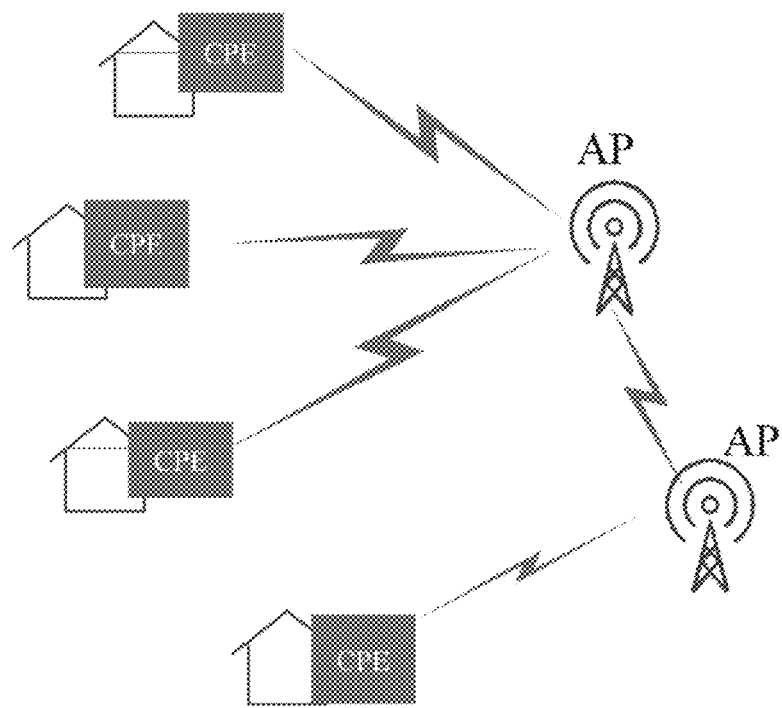
FIG. 1 schematically illustrates an embodiment of a wireless passive optical network.

Wireless passive optical networks (WPONs) are developed which aim at providing last-mile connectivity, using wireless technologies operating at 60 GHz. In order to make such a deployment cost-effective, the WPON access point (AP) and customer pemises equipment (CPE) should be easy to deploy and be capable of auto-configuration and self-organization to adapt the operation thereof to the dynamic challenging environment where it is deployed, e.g. new APs and CPEs deployed in the vicinity in an ad-hoc manner, without network planning, while optimising system performance. FIG. 1 illustrates an exemplary embodiment of such a WPON comprising a plurality of APs and a plurality of CPEs.

In this light, and because proper operation in the 60 GHz highly depends on beamforming gains, it is important that the available beams or beamforming codebook entries at the APs and preferably also at the CPEs are optimised for the particular scenario in which the respective node is working. A static beamforming codebook which is set up from factory typically results in a suboptimal operation and dissatisfactory performance.

The use of highly directional beams and the propagation characteristics of mm-wave frequencies make likely the generating interference towards neighbouring nodes (APs and/or CPEs) in dense deployments. The highly directional beams of one AP or CPE may accidentally interfere the reception of another AP or CPE. Current WPON solutions are found to be suboptimal due to the lack of intelligence and adaptability to the respective working scenario or environment. In other words, prior art APs mostly work as independent boxes which makes that this interference issue is a significant concern.

Hereby a method and a system are proposed to realise, on the one hand, an improved AP to CPE association, which is adapted to the particular deployment scenario or environment, and, on the other hand, a (re)configurable beam definition or beamforming codebook design to mitigate such interference and optimise system performance.

This (re)configurability is particularly beneficial in dynamic scenarios where many APs and CPEs are already deployed, and new ones are continuously added. As a result of the changing scenario, there is an on-demand need to (re-)adapt both the AP to CPE association as well as the AP beamforming codebook to maximise network performance. Note that human intervention is not an option.

Figure 2:
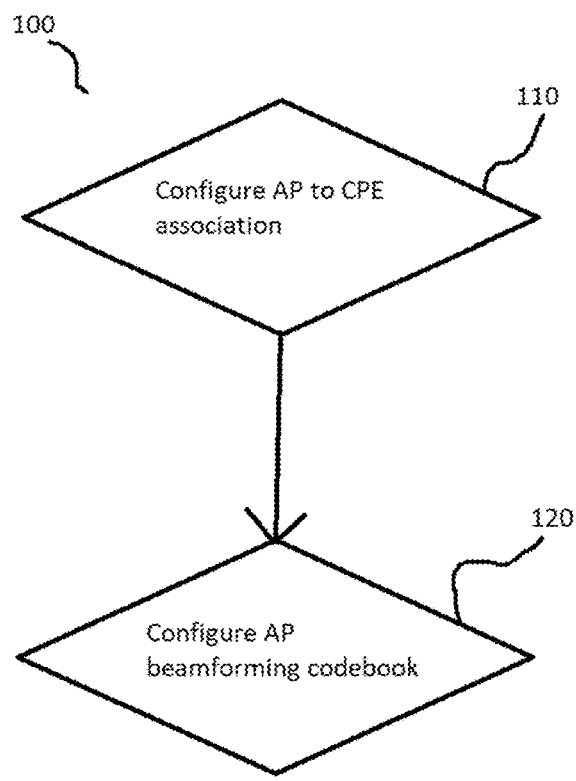
FIG. 2 schematically illustrates a flowchart of an embodiment of a method for managing a wireless passive optical network.
Figure 3:
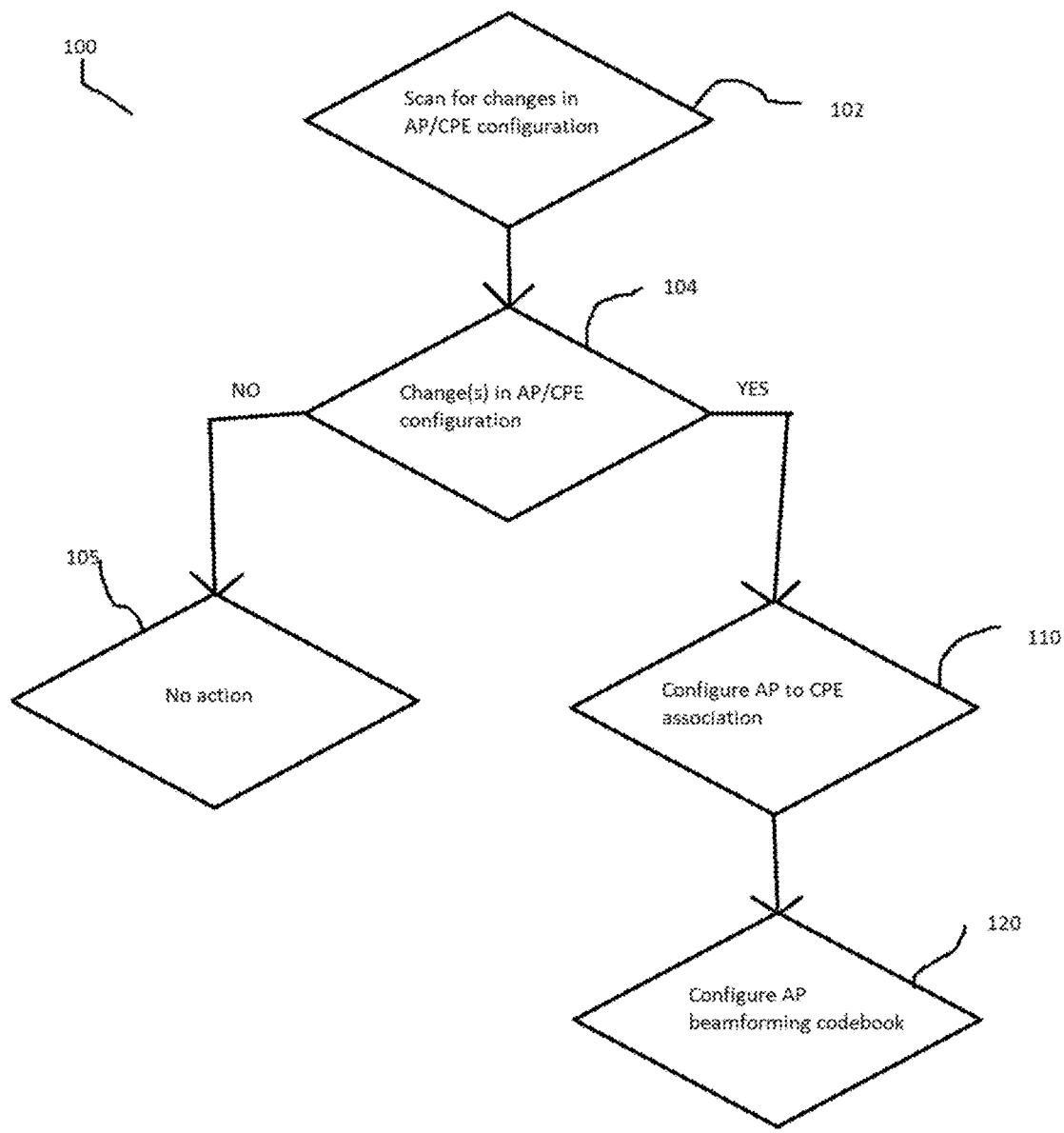
FIG. 3 schematically illustrates a flowchart of an alternative embodiment of a method for managing a wireless passive optical network.

FIG. 2 illustrates a flowchart of an embodiment of a method for managing a WPON as illustrated in FIG. 1. The method 100 comprises a first step 110 of configuring an AP to CPE association based on a load balancing algorithm such that each CPE of the plurality of CPEs is associated with at least one AP of the plurality of APs. Configuring of the AP to CPE association may be performed by a controller which is a logical entity which may be located in a physical central controller or in any one of the APs or CPEs of the WPON. The configuring 110 of the AP to CPE association may be triggered when a new AP and/or CPE has been deployed in the neighbourhood or environment. This is illustrated in the embodiment of FIG. 3 which comprises an initial step 102 of scanning the WPON for changes in AP and/or CPE configuration and a step 104 of triggering the configuring of the AP to CPE association when an AP is added and/or removed from the WPON and/or when a CPE is added and/or removed from the WPON. When no added CPE or AP is detected, no action 105 needs to be taken. The illustrated embodiment of FIG. 3 may be particularly beneficial in a dynamic scenario with many APs and CPEs wherein new APs and/or CPEs are continuously deployed. This requires a need to re-optimise both the AP to CPE association as well as the AP beamforming codebook(s) and/or the CPE beamforming codebook(s) to maximise performance. For simplicity and without loss of generality, it is assumed that the APs and CPEs are substantially static, that there is always a LoS path between a pair of associated APs and CPEs, and that a central controller can act in any relevant cluster of nodes.

Changes in AP and/or CPE configuration may be detected when the added AP or CPE self-integrate in the WPON and requires an internet protocol (IP) address. It is however clear to the skilled person that any auto-configuration information other than an IP address may be used. For example radio frequency measures cam be done to detect whether the neighbourhood has changed in comparison with previous measurements or signatures.

Alternatively, or in addition to the scanning step 102, the configuring 110 of the AP to CPE association may be triggered on a periodic basis.

The step 110 of configuring the AP to CPE association may comprise (re)computing the best possible AP to CPE association to ripe load balancing gains. A load balancing algorithm will be used. A possible embodiment would be to map APs to CPEs based on receive signal strength measurements and/or a balanced CPE headcount across all the APs. For example, in a scenario wherein there are three APs and thirty CPEs, it may be beneficial to have ten CPEs per AP. It is clear to the skilled person that this number may vary depending on the measured receive signal strengths or any other relevant parameters. In a preferred embodiment, load balancing is done according to the amount of traffic in the WPON rather than according to a mere headcount.

Step 110 of configuring the AP to CPE association may comprise re-association or de-association wherein de-association removes the CPE as a possible mesh hop, or frees up beamforming codebook capacity at the AP.

Figure 4:
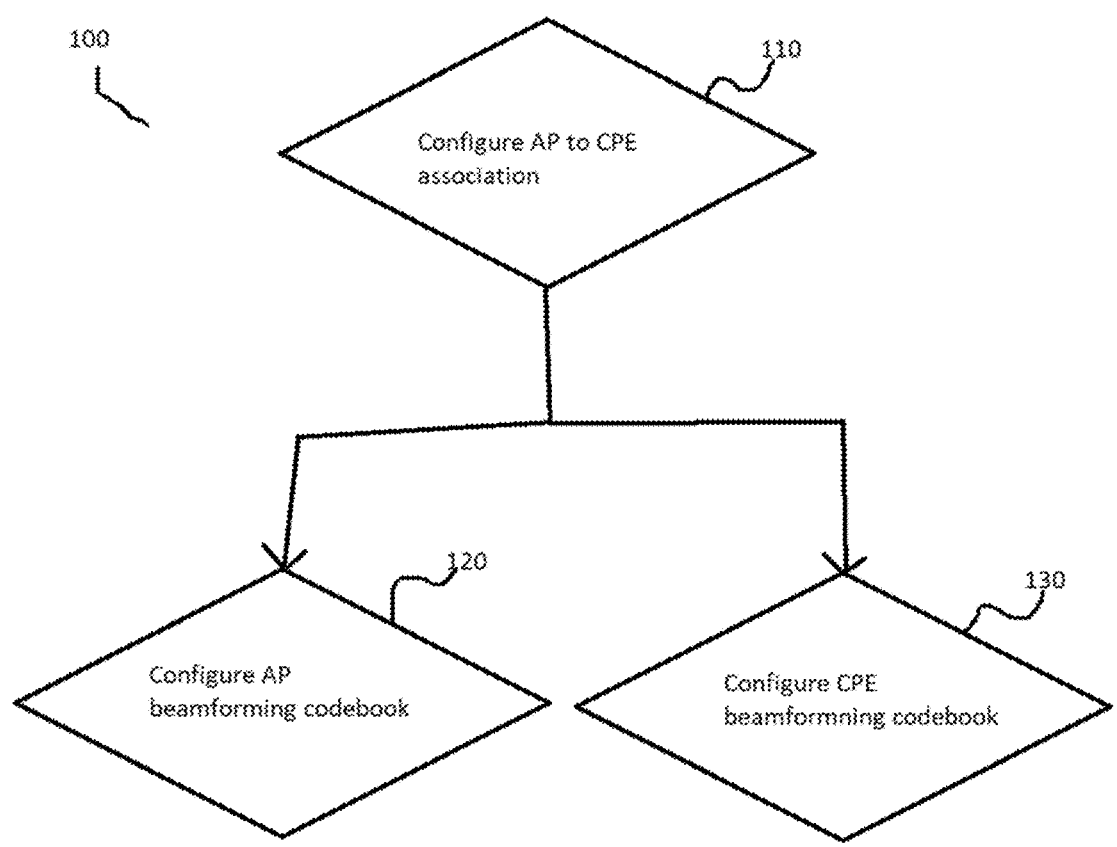
FIG. 4 schematically illustrates a flowchart of a further embodiment of a method for managing a wireless passive optical network.

The embodiment of FIGS. 2, 3 and 4 further comprise step 120 of configuring for each AP of the plurality of APs an AP beamforming codebook based on the configured CPE to AP association. The AP beamforming codebook comprises entries wherein each entry is representative for a beam pattern to be transmitted by said AP, and wherein the AP beamforming codebook comprises for each CPE associated with the respective AP a line of sight, LoS, entry representative for a beam pattern to be transmitted to the respective CPE via a LoS path between the AP and the respective CPE, and at least one back-up entry representative for a beam pattern to be transmitted to the respective CPE via a back-up path which is different from the LoS path. The at least one back-up entry may comprise any one of a reflection entry representative for a beam pattern to be transmitted to the respective CPE via a reflected path, and a relay entry representative for a beam pattern to be transmitted to the respective CPE via a relay path wherein at least one CPE of the plurality of CPEs other than the respective CPEs is used as a relay. In other words, the AP beamforming codebook entries may be divided into two or three subsets: i) entries to transmit of the LoS path between the AP and each CPE; ii) back-up entries to transmit over a reflected path between the AP and each CPE; and iii) back-up entries to transmit over at least one relay node (AP and/or CPE). The back-up entries may be used for fast adaptation when the LoS path is blocked, e.g. due to a moving object. Different entries may also have associated therewith a different transmit power. Assuming in an example that an AP beamforming codebook has room for 64 entries and wherein ten CPEs are associated with the AP, ten AP beamforming codebook entries may be used for the respective LoS paths between the AP and each associated CPE, and the remaining 54 entries may be used for back-up entries such as reflection entries and/or relay entries, i.e. five back-up entries reserved for each associated CPE.

A reflected entry may correspond with a non-LoS entry and a relay entry may correspond with a mesh back-up entry, wherein a neighbouring CPE is used as a relay which is different from a pure non-LoS path. The mesh back-up path or route may be used for best-effort traffic improvement, and may provide better throughput in comparison with a non-LoS or reflected path.

Preferably the beamforming codebook(s) is/are optimized on a per-network basis, i.e. prioritizing links, etc.

Beamforming codebook entries may comprise any one of, or a combination of entries for:

a LoS path in order to optimize directive gain;
n times non-LoS backup paths;
m times mesh backup paths;
a LoS path in order to optimize for clean transmission based on for example a sum-noise criterion;
k times LoS path in order to optimize for clean transmission towards k neighboring links.

In an embodiment the load balancing algorithm during step 110 of configuring the CPE to AP association takes into account the number of available AP beamforming codebook entries per CPE. When considering different traffic per CPE and optimising the load balancing according to such traffic load, some APs may get much more CPEs than others. As a result, APs with many CPEs may quickly run out of available beamforming codebook entries for some CPEs, and thus a different load balancing algorithm to configure the CPE to AP association may be beneficial. In an exemplary embodiment to derive an optimal CPE to AP association, the minimum achievable throughput is maximized, considering the protection or back-up transmission paths provided by the back-up entries of the beamforming codebook. The skilled person is aware of theoretical capacity computations to achieve this. This can for example be performed via a machine learning algorithm where different CPE to AP associations are tried and a reward is given to the good ones.

Once the beamforming codebooks are configured, it is important to select the preferred beamforming codebook entry to use for transmission. This preferred entry is usually the LoS entry as it provides the strongest signal and the shortest delay. However, the LoS transmission path may be obstructed. In such a case, an optimisation problem targeted at maximising the user achievable throughput needs to be solved to identify the preferred (back-up) beamforming codebook entry. This achievable throughput should consider the signal quality provided by such a (back-up) beamforming codebook entry, and preferably as well as the delay. Typically a relay transmission path corresponding with a relay entry incurs longer delays as it involves a multi-hop communication, but depending on the environment and/or deployment a relay entry may be preferred. The skilled person is aware of theoretical capacity computations to solve such optimisation problems. This can also be done via a machine learning algorithm where different beamforming codebook entries are tried and a reward is given to the good ones.

To facilitate the selection of the correct beamforming codebook entry, the AP can associate an identifier such as the MAC address of the CPE to its corresponding beamforming codebook entries, and then only search the respective entries belonging to a particular CPE when said particular CPE is selected.

Especially in cases when available entries of a beamforming codebook are limited, it is proposed to create multiple beamforming codebooks such that an optimised beamforming codebook is provided per subset of CPEs or even per individual CPE. Then, the AP is able to pull at each moment in time the required beamforming codebook according to the CPE scheduling decision. This would result in more beamforming codebook entries per CPE at the expense of memory at the AP in order to keep a larger number of beamforming codebooks, or a fast connection to a central controller to retrieve the right beamforming codebook.

In addition to configuring the AP beamforming codebook entries, also entries of the CPE beamforming codebook may be configured during step 130 as illustrated in FIG. 4. The CPE beamforming codebook typically has lots of space for backup entries, given the CPE typically sees maximum 5-10

APs in a typical WPON deployment. An AP in the WPON can transmit to other APs or CPEs and receive from other APs or CPEs in the WPON. In a similar manner, a CPE in the WPON can transmit to other APs or CPEs and receive from other APs or CPEs in the WPON. Due to the challenging 60 GHz channel, where attenuation is large due to oxygen absorption, beam alignment is key to combat the large path loss. Therefore, by configuring a CPE beamforming codebook based on the configured association in addition to the configuration of AP beamforming codebooks, both the antenna gain of AP and the antenna gain of CPE may be aligned. In this manner, both the AP(s) and CPE(s) can be configured to have optimal beams pointing towards each other and/or overlapping with each other.

In a similar manner as described for the AP beamforming codebook the CPE beamforming codebook comprises line of sight (LoS) entries and back-up entries.

It is clear to the skilled person that the amount of CPEs associated with an AP may change depending on the actual WPON deployment. It will be understood by the skilled person that the features and advantages disclosed hereinabove with respect to embodiments regarding AP beamforming codebooks may also apply, mutatis mutandis, to embodiments regarding CPE beamforming codebooks.

Figure 5:
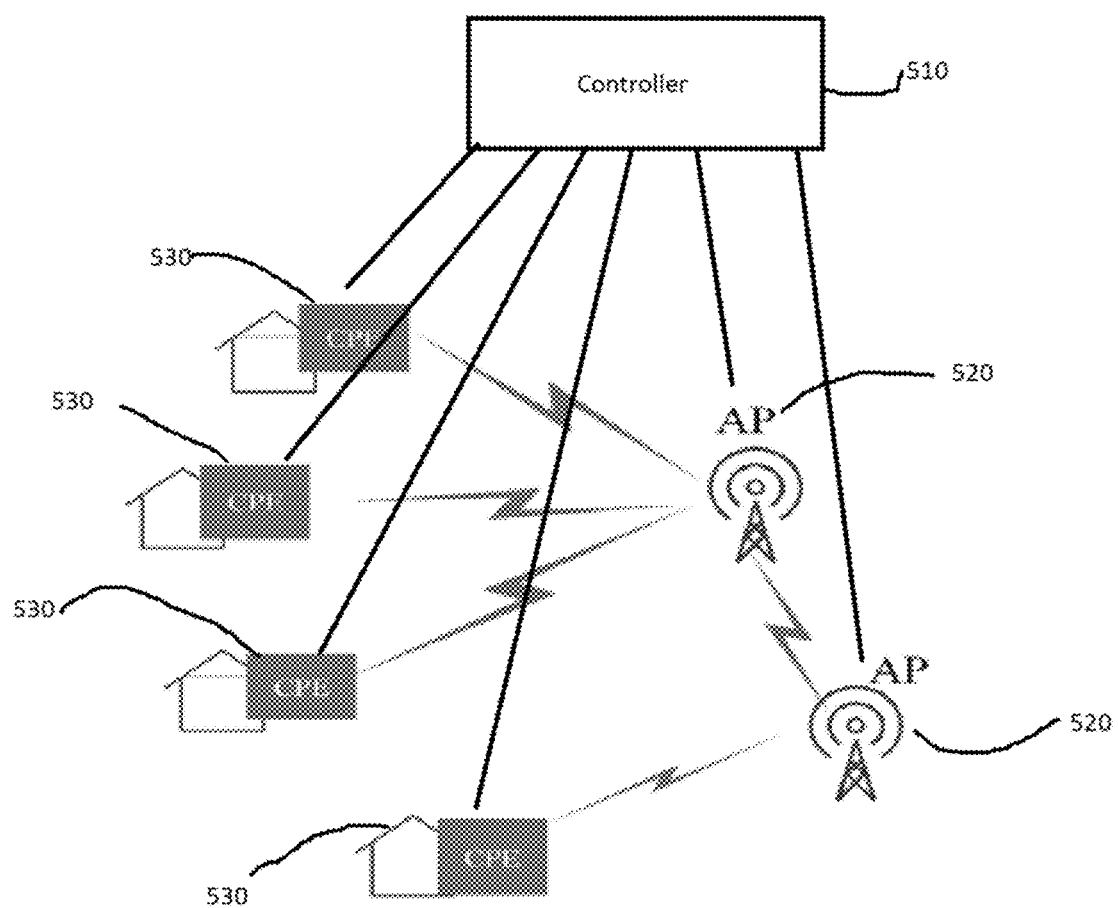
FIG. 5 schematically illustrates an embodiment of a wireless passive optical network managing system.

FIG. 5 schematically illustrates a WPON managing system for managing a WPON comprising a plurality of APs 520 and a plurality of CPEs 530, wherein the managing system comprises a controller 510 which is configured to configure an AP to CPE association based on a load balancing algorithm such that each CPE of the plurality of CPEs is associated with at least one AP of the plurality of APs. The controller is further configured to configure for each AP of the plurality of APs an AP beamforming codebook based on the configured association, wherein the AP beamforming codebook comprises entries wherein each entry is representative for a beam pattern to be transmitted by said AP. The AP beamforming codebook comprises for each CPE associated with the respective AP a line of sight, LoS, entry representative for a beam pattern to be transmitted to the respective CPE via a LoS path between the AP and the respective CPE, and at least one back-up entry representative for a beam pattern to be transmitted to the respective CPE via a back-up path which is different from the LoS path.

The at least one back-up entry may comprise a reflection entry representative for a beam pattern to be transmitted to the respective CPE via a reflected path. Alternatively, or in addition the at least one back-up entry may comprise a relay entry representative for a beam pattern to be transmitted to the respective CPE via a relay path wherein at least one CPE of the plurality of CPEs other than the respective CPEs is used as a relay.

In an embodiment the controller 510 is configured to scan the WPON for changes in AP 520 and/or CPE 530 configuration, and to trigger the configuring of the AP to CPE association when an AP 520 is added and/or removed from the WPON and/or when a CPE 530 is added and/or removed from the WPON.

In addition or alternatively, the controller 510 may be configured to periodically configure the AP to CPE association.

The controller 510 may be a logical entity which is located in a physical central controller or in any one of the APs 520 or CPEs 530 of the WPON A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The program storage devices may be resident program storage devices or may be removable program storage devices, such as smart cards. The embodiments are also intended to cover computers programmed to perform said steps of the above-described methods.

The description and drawings merely illustrate the principles of the present invention. It will thus be appreciated that those skilled in the art will be able to devise various arrangements that, although not explicitly described or shown herein, embody the principles of the present invention and are included within its scope. Furthermore, all examples recited herein are principally intended expressly to be only for pedagogical purposes to aid the reader in understanding the principles of the present invention and the concepts contributed by the inventor(s) to furthering the art, and are to be construed as being without limitation to such specifically recited examples and conditions. Moreover, all statements herein reciting principles, aspects, and embodiments of the present invention, as well as specific examples thereof, are intended to encompass equivalents thereof.

The functions of the various elements shown in the figures, including any functional blocks labelled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the present invention. Similarly, it will be appreciated that any flowcharts, flow diagrams, state transition diagrams, pseudo code, and the like represent various processes which may be substantially represented in computer readable medium and so executed by a computer.

It should be noted that the above-mentioned embodiments illustrate rather than limit the present invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The present invention can be implemented by means of hardware comprising several distinct elements and by means of a suitably programmed computer. In claims enumerating several means, several of these means can be embodied by one and the same item of hardware. The usage of the words "first", "second", "third", etc. does not indicate any ordering or priority. These words are to be interpreted as names used for convenience.

In the present invention, expressions such as "comprise", "include", "have", "may comprise", "may include", or "may have" indicate existence of corresponding features but do not exclude existence of additional features.

Whilst the principles of the present invention have been set out above in connection with specific embodiments, it is to be understood that this description is merely made by way of example and not as a limitation of the scope of protection which is determined by the appended claims.

The invention claimed is:

1. A method for managing a wireless passive optical network (WPON) comprising a plurality of access points (APs) and a plurality of customer premises equipments (CPEs) the method comprising:
    configuring an AP to CPE association based on a load balancing algorithm such that each CPE of the plurality of CPEs is associated with at least one AP of the plurality of APs; and
    configuring, for each AP of the plurality of APs, an AP beamforming codebook based on the configured association,
    wherein the AP beamforming codebook comprises entries wherein each entry represents a beam pattern to be transmitted by the AP, and
    wherein the AP beamforming codebook comprises, for each CPE associated with the respective AP,
        a line of sight (LoS) entry representing a beam pattern to be transmitted to the respective CPE via a LoS path between the AP and the respective CPE, and
        at least one back-up entry representing a beam pattern to be transmitted to the respective CPE via a back-up path which is different from the LoS path.

2. The method according to claim 1, wherein the at least one back-up entry comprises a reflection entry resenting a beam pattern to be transmitted to the respective CPE via a reflected path.

3. The method according to claim 1,
    wherein the at least one back-up entry comprises a relay entry representing a beam pattern to be transmitted to the respective CPE via a relay path, and
    wherein at least one CPE of the plurality of CPEs other than the respective CPE or at least one AP of the plurality of APs other than the respective AP, or both, is used as a relay.

4. The method according to claim 1, further comprising:
    scanning the WPON for at least one of changes in AP configuration or changes in CPE configuration; and
    triggering the configuring of the AP to CPE association when at least one of an AP is added to the WPON, an AP is removed from the WPON, a CPE is added to the WPON, or a CPE is removed from the WPON.

5. The method according to claim 1, wherein the configuring the AP to CPE association is performed periodically.

6. The method according to claim 1, further comprising:
    configuring, for at least one CPE of the plurality of CPEs, a CPE beamforming codebook based on the configured association,
    wherein the CPE beamforming codebook comprises entries, and
    wherein each entry represents a beam pattern to be transmitted by the at least one CPE.

7. The method according to claim 1, wherein the configuring the AP to CPE association comprises at least one of de-associating a CPE from an AP, re-associating a CPE to an AP, associating a CPE to an AP, or any combination thereof.

8. The method according to claim 1, wherein the configuring the AP beamforming codebook comprises associating an identifier of the respective CPE with each entry for a respective CPE.

9. The method according to claim 1,
    wherein the configuring the AP beamforming codebook comprises configuring multiple AP codebooks per AP, and
    wherein each AP codebook corresponds with a subset of CPEs from the plurality of CPEs.

10. A wireless passive optical network (WPON) managing system for managing a WPON comprising a plurality of access points (APs) and a plurality of customer premises equipments (CPEs), the system comprising a controller configured to:
    configure an AP to CPE association based on a load balancing algorithm such that each CPE of the plurality of CPEs is associated with at least one AP of the plurality of APs; and
    configure, for each AP of the plurality of APs, an AP beamforming codebook based on the configured association,
    wherein the AP beamforming codebook comprises entries wherein each entry is representative for a beam pattern to be transmitted by said AP, and
    wherein the AP beamforming codebook comprises, for each CPE associated with the respective AP,
        a line of sight (LoS) entry representing a beam pattern to be transmitted to the respective CPE via a LoS path between the AP and the respective CPE, and
        at least one back-up entry representing a beam pattern to be transmitted to the respective CPE via a back-up path which is different from the LoS path.

11. The managing system according to claim 10, wherein the at least one back-up entry comprises a reflection entry representing a beam pattern to be transmitted to the respective CPE via a reflected path.

12. The managing system according to claim 10,
    wherein the at least one back-up entry comprises a relay entry representing a beam pattern to be transmitted to the respective CPE via a relay path, and
    wherein at least one CPE of the plurality of CPEs other than the respective CPE or at least one AP of the plurality of APs other than the respective AP, or both, is used as a relay.

13. The managing system according to claim 10, wherein the controller is configured to:
    scan the WPON for changes in at least one of AP configuration or CPE configuration; and
    trigger the configuring of the AP to CPE association when at least one of an AP is added from the WPON, an AP is removed from the WPON, a CPE is added from the WPON, and or a CPE is removed from the WPON.

14. The managing system according to claim 10, wherein the controller is configured to periodically configure the AP to CPE association.

15. A non-transitory computer-readable medium storing instructions, which when executed by a computer, cause the computer to perform the method of claim 1.

* * * * *